(12) United States Patent
Huang et al.

(10) Patent No.: US 11,977,383 B2
(45) Date of Patent: May 7, 2024

(54) INTELLIGENT COURSE PLANNING METHOD AND CONTROLLER FOR UNMANNED SURFACE VEHICLE

(71) Applicant: Shanghai Maritime University, Shanghai (CN)

(72) Inventors: Zhijian Huang, Shanghai (CN); Lizhe Yang, Jiaozuo (CN); Siyu Zhang, Chongqing (CN); Guichen Zhang, Shanghai (CN); Yanji Liu, Shanghai (CN); Hongren Wang, Wenzhou (CN)

(73) Assignee: Shanghai Maritime University, Shanghai (CN)

( * ) Notice: Subject to any disclaimer, the term of this patent is extended or adjusted under 35 U.S.C. 154(b) by 0 days.

(21) Appl. No.: 18/366,669

(22) Filed: Aug. 7, 2023

(65) Prior Publication Data
US 2024/0118694 A1  Apr. 11, 2024

(30) Foreign Application Priority Data

Sep. 22, 2022 (CN) .......................... 202211158293.7

(51) Int. Cl.
*G05D 1/00* (2006.01)
*G05D 1/02* (2020.01)
*G06N 3/04* (2023.01)

(52) U.S. Cl.
CPC ......... *G05D 1/0088* (2013.01); *G05D 1/0206* (2013.01); *G06N 3/04* (2013.01)

(58) Field of Classification Search
CPC ....... G05D 1/0088; G05D 1/0206; G06N 3/04
See application file for complete search history.

(56) References Cited

U.S. PATENT DOCUMENTS 11,274,929 B1 * 3/2022 Afrouzi ................. G01C 21/165
2019/0295003 A1 * 9/2019 Dronen .................... G06N 7/00
(Continued)

FOREIGN PATENT DOCUMENTS

CN          102400 A1 * 2/2019  .......... G05D 1/0206
CN       110018687 A  * 7/2019  .......... G05D 1/0206
(Continued)

OTHER PUBLICATIONS

Tang Chong et al., Application of lm-proved LM-RBF Neural Network in ARDC; Ordnance Industry Automation; Jul. 2020, vol. 39, pp. 11-15 and 28.

*Primary Examiner* — Nga X Nguyen

(57) ABSTRACT

An intelligent course planning method and controller for unmanned surface vehicle are provided, an overall optimization from starting point to end point of course deflection angle is achieved based on an optimization principle of approximate dynamic programming; an optimization of minimization of the course deflection angle and a control signal is achieved based on a quadratic form cost function and a performance index by designing a virtual radial basis function neural network and a least square method, a target course expression is obtained, and a stability and a degree of convergence are ensured through a positive-definite constraint of the Hessian matrix of the performance index. Compared with the related art, an overshoot of course deflection and the control signal is reduced, an optimization of flight and steering energy consumption is achieved, and completely data-driven for intelligent course planning for unmanned surface vehicle and a high-accuracy feedback adjustment are achieved.

5 Claims, 2 Drawing Sheets

(56) References Cited

U.S. PATENT DOCUMENTS

2021/0003404 A1\* 1/2021 Zeng ................. G01C 21/3859
2022/0307849 A1\* 9/2022 Chattopadhyay .. G01C 21/3807

FOREIGN PATENT DOCUMENTS

CN 110018687 A 7/2019
CN 113900372 A 1/2022

\* cited by examiner

INTELLIGENT COURSE PLANNING METHOD AND CONTROLLER FOR UNMANNED SURFACE VEHICLE

TECHNICAL FIELD

The disclosure relates to the field of intelligent control and naval architecture and ocean engineering technologies, and more particularly to an intelligent course planning method and controller for unmanned surface vehicle.

BACKGROUND

With rapid development of unmanned technology, unmanned surface vehicles are receiving increasing attention in recent years. Compared with unmanned aerial vehicles and unmanned ground vehicles, research of unmanned surface vehicles is still in an exploratory stage. As a small water surface platform with an autonomous planning and autonomous course capability, movement of an unmanned surface vehicle is non-linear and interference of the unmanned surface vehicle is uncertain in a complex and ever-changing water environment. Thus, a course planning and control technology of the unmanned surface vehicle is particularly important.

For example, a Chinese patent application NO. CN202110533417.4 (corresponding to patent publication NO. CN113341953A) discloses a course control method for a gondola-type unmanned surface vehicle, in which a time-delay problem can be reduced and a requirement for course deviation control of an inland unmanned surface vehicle is met. A Chinese patent application NO. CN202111549519.1 (corresponding to patent publication NO. CN114371701A) discloses a course control method for unmanned surface vehicle, a controller, an autopilot, and an unmanned surface vehicle, in which a course control method for unmanned surface vehicle based on a fuzzy adaptive proportional derivative (PD) control is achieved. A Chinese patent application NO. CN202110306691.8 (corresponding to patent publication NO. CN112947477A) discloses a course active-disturbance-rejection control system and control method for unmanned surface vehicle, in which a course active-disturbance-rejection control system and control method for unmanned surface vehicle based on a fuzzy neural network is achieved. A Chinese patent application NO. CN202210591518.1 (corresponding to patent publication NO. CN114894187A) discloses a navigation method for unmanned surface vehicle, and a difficult navigation problem of a course angle drifting of the unmanned surface vehicle is solved.

However, most of the above methods belong to traditional methods, which are used to solve a single issue related to course control for the unmanned surface vehicle; the above methods do not yet have an ability of intelligent course planning for unmanned surface vehicle, and do not have an effect of global optimization for intelligent planning.

Therefore, in an aspect of course planning and controlling for the unmanned surface vehicle, a signal technology is difficult to apply to a complex water environment and meet a global planning requirement. Various intelligent control technologies and intelligent algorithms can be fused to design a course controller for unmanned surface vehicle, which can ensure superior planning and control effectiveness in different scenarios.

SUMMARY

A purpose of the disclosure is to provide an intelligent course planning method and controller for unmanned surface vehicle to overcome defects of the above related art.

The purpose of the disclosure can be implemented through the following technical solutions.

An intelligent course planning method for unmanned surface vehicle is provided, which includes:
constructing a dynamic system of intelligent course planning for unmanned surface vehicle;
transforming a form of the dynamic system of intelligent course planning for unmanned surface vehicle;
designing a cost function of intelligent course planning for unmanned surface vehicle based on the dynamic system of intelligent course planning for unmanned surface vehicle after transforming the form;
designing a performance index and a continuous approximation difference of the performance index of intelligent course planning for unmanned surface vehicle based on the cost function;
designing a neural network model based on the performance index and the continuous approximation difference of the performance index;
equivalently obtaining a function in the performance index of intelligent course planning for unmanned surface vehicle based on the neural network model;
obtaining a target course expression of intelligent course planning for unmanned surface vehicle based on the function in the performance index;
constructing a Hessian matrix based on the target course expression and the performance index, and determining a positive definiteness of the Hessian matrix; and
in a situation that the positive definiteness of the Hessian matrix meets a preset requirement, outputting the target course expression and inputting the target course expression into a preset feedback network.

In an embodiment, the dynamic system of intelligent course planning for unmanned surface vehicle is constructed based on an equation as follows:

$$\ddot{\theta}(t) = -\frac{MgL}{J}\sin(\theta(t)) - \frac{D}{J}\dot{\theta}(t) + \frac{1}{J}v(t) + \frac{1}{J}u(t);$$

where $\theta(t)$ represents a course deflection angle of an unmanned surface vehicle; $\dot{\theta}(t)$ represents a first order partial derivative of the course deflection angle of the unmanned surface vehicle with respect to time; $\ddot{\theta}(t)$ represents a second order partial derivative of the course deflection angle of the unmanned surface vehicle with respect to time; M represents a payload mass of the unmanned surface vehicle; g represents a gravitational acceleration; L represents a length of the unmanned surface vehicle; J represents a moment of inertia of the unmanned surface vehicle; D represents a viscous frictional resistance of the unmanned surface vehicle; v(t) represents a disturbance signal of an actual sea condition; u(t) represents a target course.

In an embodiment, the transforming a form of the dynamic system of intelligent course planning for unmanned surface vehicle includes:
defining formulas $\theta(t)=x_1(t)$, and $\dot{\theta}(t)=x_2(t)$;
transforming the form of the dynamic system of intelligent course planning for unmanned surface vehicle b using formulas are as follows:

$$\begin{cases} \dot{x}_1(t) = x_2(t) \\ \dot{x}_2(t) = -\frac{MgL}{J}\sin(x_1(t)) - \frac{D}{J}x_2(t) + \frac{1}{J}v(t) + \frac{1}{J}u(t) \end{cases};$$

where $\dot{x}_1(t)$ represents a first order partial derivative of $x_1(t)$ with respect to time, $\dot{x}_2(t)$ represents a first order partial derivative of $x_2(t)$ with respect to time; and where in the form, a state variable of the dynamic system of intelligent course planning for unmanned surface vehicle is $x(t)=[x_1(t),x_2(t)]^T$.

In an embodiment, a formula of the designing a cost function of intelligent course planning for unmanned surface vehicle based on the dynamic system of intelligent course planning for unmanned surface vehicle after transforming the form is as follows:

$$\gamma(t)=\gamma[x(t),u(t),t]=a_1\Delta x_1^2(t)+a_2\Delta x_2^2(t)+a_3u^2(t);$$

where both $\gamma(t)$ and $\gamma[x(t),u(t),t]$ represent cost functions of intelligent course planning for unmanned surface vehicle at time t; $\Delta x_1(t)$ represents a difference between a course deflection angle at the time t and a course deflection angle of a planning route at the time t; $\Delta x_2(t)$ represents a partial derivative of the course deflection angle at the time t with respect to the time t; and $a_1$, $a_2$, and $a_3$ represent optimization weight coefficients of $\Delta x_1(t)$, $\Delta x_2(t)$ and $u(t)$, respectively.

In an embodiment, formulas for designing, based on the cost function, the performance index $Q(t)$ of intelligent course planning for unmanned surface vehicle are as follows:

$$Q(t) = [\Delta x_1(t), \Delta x_2(t), u(t)]P(t)[\Delta x_1(t), \Delta x_2(t), u(t)]^T;$$

$$P(t) = \begin{bmatrix} p_{11}(t); & p_{12}(t); & p_{13}(t) \\ & p_{22}(t); & p_{23}(t) \\ & & p_{33}(t) \end{bmatrix};$$

where P(t) is an upper triangular weight matrix of a quadratic performance index (i.e., P(t) is a matrix in the performance index), and each of elements in P(t) is a variable of the time t;

the continuous approximation difference of the performance index Q(t) of intelligent course planning for unmanned surface vehicle is recorded as $\gamma(t+1)$ based on the cost function, and $\gamma(t+1)$ represents a difference between performance indexes Q(t) and Q(t+1) at adjacent sampling times t and t+1, and an expression of $\gamma(t+1)$ is as follows:

$$Q(t)-\alpha Q(t+1)=Q(x(t),u(t))-\alpha Q(x(t+1),u(t+1))=\gamma[x(t+1),u(t+1),t+1]=\gamma(t+1);$$

where $\alpha$ represents a discount factor, and $\alpha>0$.

In an embodiment, the neural network model is a radial basis function (RBF) neural network model, and the designing a neural network model based on the performance index and the continuous approximation difference of the performance index, includes:

designing a basic function of an RBF neural network as a matrix $\phi(x(t),u(t))$, where a formula of the matrix $\phi(x(t), u(t))$ is as follows:

$$\phi(x(t),u(t))=[x_1^2(t),2x_1(t)x_2(t),2x_1(t)u(t),x_2^2(t),2x_2(t)u(t),u^2(t)]^T;$$

designing a connection weight parameter of the RBF neural network as a matrix w(t), where a formula of the matrix w(t) is as follows:

$$w(t)=[p_{11}(t),p_{12}(t),p_{13}(t),p_{22}(t),p_{23}(t),p_{33}(t)]^T;$$

where each variable in the matrix w(t) is consistent with a corresponding variable in the matrix P(t) in the performance index of intelligent course planning for unmanned surface vehicle.

In an embodiment, N sampling data pairs of $\Phi(t)$ and $\Gamma(t)$ at adjacent sampling times are collected by the RBF neural network model, and $\Phi(t)$ is related to the basic function of the RBF neural network, $\Gamma(t)$ is related to the continuous approximation difference of the performance index of intelligent course planning for unmanned surface vehicle, the N sampling data pairs are aligned and arranged to obtain $\Phi(t)$ and $\Gamma(t)$, and formulas of $\theta(t)$ and $\Gamma(t)$ are as follows:

$$\Phi(t) = [\phi_1(x(t), u(t)) - \phi_1(x(t+1), u(t+1)),$$
$$\phi_2(x(t+1), u(t+1)) - \phi_2(x(t+2), u(t+2)), \ldots,$$
$$\phi_N(x(t+N-1), u(t+N-1)) - \phi_N(x(t+N), u(t+N))];$$

$$\Gamma(t) = \begin{bmatrix} \gamma_1[x(t+1), u(t+1), t+1] \\ \gamma_2[x(t+2), u(t+2), t+2] \\ \vdots \\ \gamma_N[x(t+N), u(t+N), t+N] \end{bmatrix};$$

where a number N of the sampling data pairs is larger than or equal to a number of the basic function of the RBF neural network; and a calculation relationship of the N sampling data pairs of $\Phi(t)$ and $\Gamma(t)$ is as follows:

$$\Phi^T(t)w(t)=\Gamma(t);$$

a least square method is used to obtain w(t), and a formula of w(t) is as follows:

$$w(t)=(\Phi(t)\Phi^T(t))^{-1}\Phi(t)\Gamma^T(t);$$

the function P(t) (i.e., matrix P(t)) in the performance index of intelligent course planning for unmanned surface vehicle is equivalently obtained.

In an embodiment, the obtaining a target course expression of intelligent course planning for unmanned surface vehicle based on the function P(t) in the performance index, includes: performing approximate dynamic planning on a target formula based on a quadratic form, where a formula of the target formula is as follows:

$$u(t) = \arg\min_{u(t)} Q(t);$$

calculating a partial derivative of the performance index Q(t) of intelligent course planning for unmanned surface vehicle on the target course u(t) to obtain the target course expression of intelligent course planning for unmanned surface vehicle, and the target course expression is as follows:

$$u(t) = -\frac{p_{13}(t)}{p_{33}(t)}\Delta x_1(t) - \frac{p_{23}(t)}{p_{33}(t)}\Delta x_2(t).$$

In an embodiment, the intelligent course planning method for unmanned surface vehicle further includes: calculating, based on the target course expression and the performance index, a second order partial derivative of the performance index Q(t) of intelligent course planning for unmanned surface vehicle on each state variable x(t) and the target course u(t) to construct the Hessian matrix, where a formula of the Hessian matrix is as follows:

$$\begin{bmatrix} \frac{\partial Q}{\partial x_1^2} & \frac{\partial Q}{\partial x_1 x_2} & \cdots & \frac{\partial Q}{\partial x_1 x_n} & \frac{\partial Q}{\partial x_1 u_1} & \frac{\partial Q}{\partial x_1 u_2} & \cdots & \frac{\partial Q}{\partial x_1 u_n} \\ \frac{\partial Q}{\partial x_2 x_1} & \frac{\partial Q}{\partial x_2^2} & \cdots & \frac{\partial Q}{\partial x_2 x_n} & \frac{\partial Q}{\partial x_2 u_1} & \frac{\partial Q}{\partial x_2 u_2} & \cdots & \frac{\partial Q}{\partial x_2 u_n} \\ \vdots & \vdots & \ddots & \vdots & \vdots & \vdots & \ddots & \vdots \\ \frac{\partial Q}{\partial u_1 x_1} & \frac{\partial Q}{\partial u_1 x_2} & \cdots & \frac{\partial Q}{\partial u_1 x_n} & \frac{\partial Q}{\partial u_1^2} & \frac{\partial Q}{\partial u_1 u_2} & \cdots & \frac{\partial Q}{\partial u_1 u_n} \\ \vdots & \vdots & \ddots & \vdots & \vdots & \vdots & \ddots & \vdots \\ \frac{\partial Q}{\partial u_n x_1} & \frac{\partial Q}{\partial u_n x_2} & \cdots & \frac{\partial Q}{\partial u_n x_n} & \frac{\partial Q}{\partial u_n u_1} & \frac{\partial Q}{\partial u_n u_2} & \cdots & \frac{\partial Q}{\partial u_n^2} \end{bmatrix}.$$

An intelligent course planning controller for unmanned surface vehicle includes a memory and a processor, the memory is configured to store a computer program, the processor is configured to call the computer program to execute the above intelligent course planning method for unmanned surface vehicle.

Compared with the related art, the disclosure has the following beneficial effects.

A control goal of intelligent course planning for unmanned surface vehicle is implemented of the disclosure based on an optimization principle of an approximate dynamic programming, that is, an overall optimization from a starting point to an end point of the course deflection angle and a step-by-step optimization can be implemented under a certain payload mass and sea condition disturbance of the unmanned surface vehicle, and a high-accuracy course planning can be implemented during an entire process of navigation of the unmanned surface vehicle.

Minimization of both the course deflection angle and a control signal can be achieved based on a quadratic form cost function and the performance index of intelligent course planning for unmanned surface vehicle by specially designing a virtual RBF neural network and the least square method, so as to reduce an overshoot of the course deflection angle and the control signal, achieve an optimization of flight and steering energy consumption, reduce a navigation power consumption for unmanned surface vehicle, and achieve completely data-driven for intelligent course planning for unmanned surface vehicle and a high-accuracy feedback adjustment.

DETAILED DESCRIPTION OF EMBODIMENTS

The following provides a detail explanation of the disclosure in conjunction with drawings and embodiments. The embodiment is implemented based on technical solutions of the disclosure and the embodiment provides detailed implementation methods and specific operation processes. However, a protection scope of the disclosure is not limited to the following embodiments.

The disclosure provides an intelligent course planning method for unmanned surface vehicle, an overall optimization from a starting point to an end point of a course deflection angle and a step-by-step optimization can be implemented based on an optimization principle of an approximate dynamic programming. Minimization of both the course deflection angle and a control signal can be achieved based on a quadratic form cost function and a performance index of an intelligent course planning for unmanned surface vehicle by specially designing a virtual radial basis function (RBF) neural network and a least square method.

Figure 1:
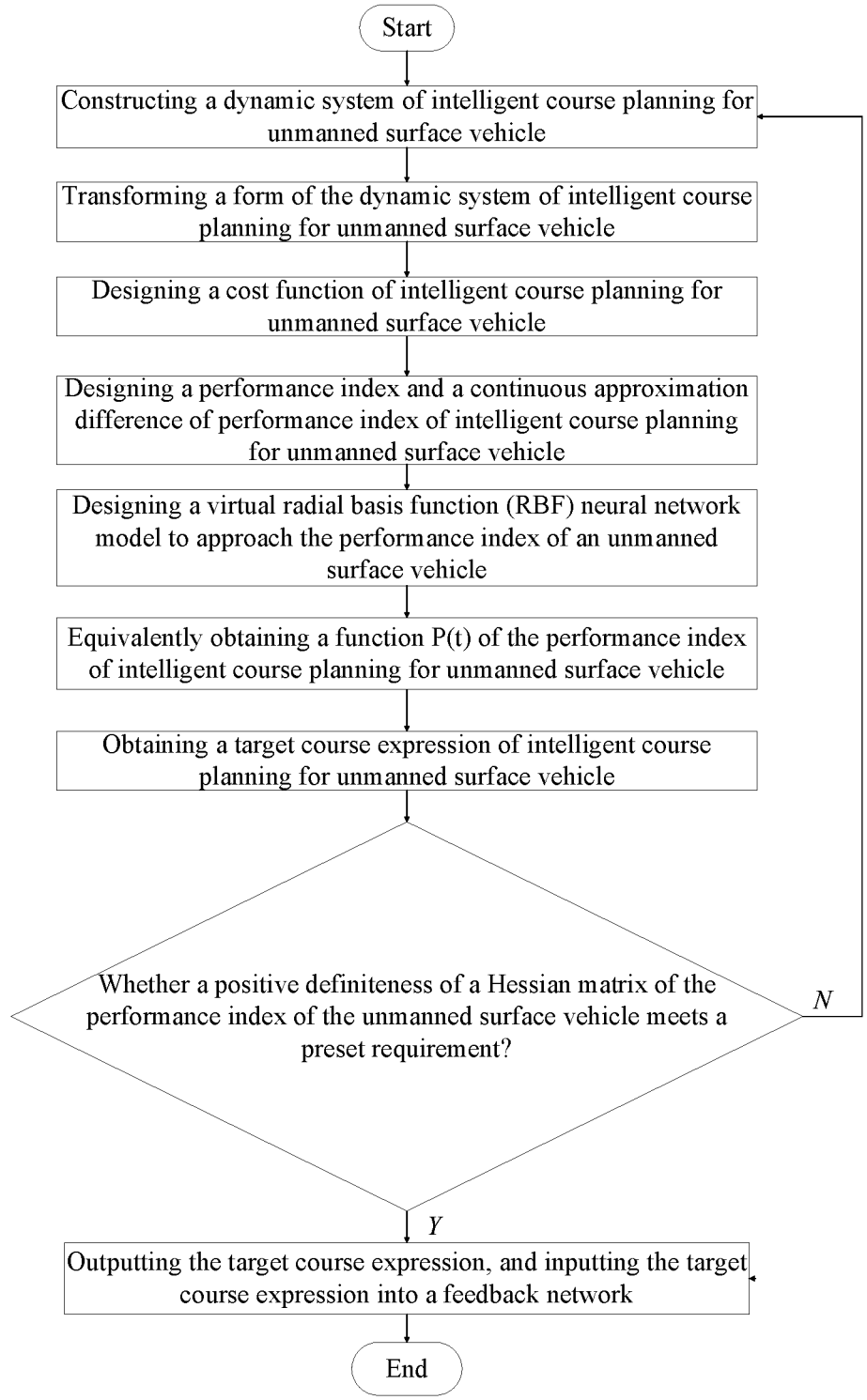
FIG. 1 illustrates a flowchart of an intelligent course planning method for unmanned surface vehicle according to an embodiment of the disclosure.

As shown in FIG. 1, an intelligent course planning method for unmanned surface vehicle includes the following steps 1-9.

In step 1, a dynamic system of intelligent course planning for unmanned surface vehicle is constructed.

In step 2, a form of the dynamic system of intelligent course planning for unmanned surface vehicle is transformed.

In step 3, a cost function of intelligent course planning for unmanned surface vehicle is designed based on the dynamic system of intelligent course planning for unmanned surface vehicle after transforming the form.

In step 4, a performance index and a continuous approximation difference of the performance index of intelligent course planning for unmanned surface vehicle are designed based on the cost function.

In step 5, a neural network model is designed based on the performance index and the continuous approximation difference of the performance index, and the neural network model is a virtual RBF neural network model.

In step 6, a function P(t) in the performance index of intelligent course planning for unmanned surface vehicle is equivalently obtained based on the virtual RBF neural network model.

In step 7, a target course expression of intelligent course planning for unmanned surface vehicle is obtained based on the function P(t) in the performance index.

In step 8, a Hessian matrix is constructed based on the target course expression and the performance index, and a positive definiteness of the Hessian matrix is determined.

In step 9, in a situation that the positive definiteness of the Hessian matrix meets a preset requirement, the target course expression is output and the target course expression is input into a preset feedback network; in a situation that the positive definiteness of the Hessian matrix does not meet the preset requirement, then return to step 1 to repeat each step in sequence.

The disclosure provides an intelligent course planning controller for unmanned surface vehicle, and the intelligent course planning controller for unmanned surface vehicle includes a memory and a processor, the memory is configured to store a computer program, the processor is configured to call the computer program to execute the above intelligent course planning method for unmanned surface vehicle.

For step 1, the dynamic system of intelligent course planning for unmanned surface vehicle is constructed in an actual sea condition, in the embodiment, a dynamic process of the dynamic system of intelligent course planning for unmanned surface vehicle can be designed based on a second-order dynamic equation as follows:

$$\ddot{\theta}(t) = -\frac{MgL}{J}\sin(\theta(t)) - \frac{D}{J}\dot{\theta}(t) + \frac{1}{J}v(t) + \frac{1}{J}u(t).$$

Where θ(t) represents a course deflection angle of an unmanned surface vehicle, a unit of θ(t) is degree (°); $\dot{θ}(t)$ represents a first order partial derivative of the course deflection angle of the unmanned surface vehicle with respect to time, a unit of $\dot{θ}(t)$ is degree per second (°/s); $\ddot{θ}(t)$ represents a second order partial derivative of the course deflection angle of the unmanned surface vehicle with respect to time, a unit of $\ddot{θ}(t)$ is degrees per square second (°/s$^2$); M represents a payload mass of the unmanned surface vehicle, a unit of M is kilogram (kg); g represents a gravitational acceleration, a unit of g is meter per square second (m/s$^2$); L represents a length of the unmanned surface vehicle, a unit of L is meter (m); J represents a moment of inertia of the unmanned surface vehicle, a unit of J is kilogram·square meter (kg·m$^2$); D represents a viscous frictional resistance of the unmanned surface vehicle a unit of D is newton per (meter per second)(N/(m/s)); ν(t) represents a disturbance signal of an actual sea condition; and u(t) represents a target course.

For step 2, the form of the dynamic system of intelligent course planning for unmanned surface vehicle is transformed, in the embodiment, formulas θ(t)=x$_1$(t) and $\dot{θ}(t)$=x$_2$(t) are defined, and formulas for transforming the form of the dynamic system of intelligent course planning for unmanned surface vehicle are as follows:

$$\begin{cases} \dot{x}(t) = x_2(t) \\ \dot{x}_2(t) = -\frac{MgL}{J}\sin(x_1(t)) - \frac{D}{J}x_2(t) + \frac{1}{J}v(t) + \frac{1}{J}u(t) \end{cases}.$$

Where, $\dot{x}_1(t)$ represents a first order partial derivative of x$_1$(t) with respect to time, $\dot{x}_2(t)$ represents a first order partial derivative of x$_2$(t) with respect to time.

In the form, a state variable of the dynamic system of intelligent course planning for unmanned surface vehicle is x(t)=[x$_1$(t),x$_2$(t)]$^T$.

In the embodiment, parameters of the dynamic system of intelligent course planning for unmanned surface vehicle are set as: M=1, g=9.8, L=0.5, j=1, and D=2, an added disturbance signal of the actual sea condition 2 is: ν(t)=x$_2$(t) sin(x$_1$(t)), an initial state of the unmanned surface vehicle is set as: x(0)=[1, −0.5], and an initial target course is set as: u(0)=−0.36$^T$.

For step 3, the designing a cost function of an intelligent course planning for unmanned surface vehicle based on the dynamic system of intelligent course planning for unmanned surface vehicle after transforming the form, which is used to achieve an optimization goal of minimization of both the course deflection angle and a control signal, so as to reduce an overshoot of the course deflection angle and the control signal, and achieve an optimization of flight and steering energy consumption. In the embodiment, a formula of the cost function can be designed as follows:

γ(t)=γ[x(t),u(t),t]=a$_1$Δx$_1$$^2$(t)+a$_2$Δx$_2$$^2$(t)+a$_3$u$^2$(t).

Where, both γ(t) and γ[x(t),u(t), t] represent cost functions of intelligent course planning for unmanned surface vehicle at time t; Δx$_1$(t) represents a difference between a course deflection angle at the time t and a course deflection angle of a planning route at the time t; Δx$_2$(t) represents a partial derivative of the course deflection angle at the time t with respect to the time t; a$_1$, a$_2$, and a$_3$ represent optimization weight coefficients of Δx$_1$(t), Δx$_2$(t) and u(t), respectively, in the embodiment, all of a$_1$, a$_2$, and a$_3$ can be valued as 1, and values of a$_1$, a$_2$, and a$_3$ can be changed according to a specific requirement in other embodiments.

For step 4, in order to achieve intelligent course planning for unmanned surface vehicle in a form of data-driven and direct feedback, formulas of the performance index Q(t) of intelligent course planning for unmanned surface vehicle are designed based on the cost function are as follows:

$$Q(t) = [\Delta x_1(t), \Delta x_2(t), u(t)]P(t)[\Delta x_1(t), \Delta x_2(t), u(t)]^T;$$

$$P(t) = \begin{bmatrix} p_{11}(t); & p_{12}(t); & p_{13}(t) \\ & p_{22}(t); & p_{23}(t) \\ & & p_{33}(t) \end{bmatrix}.$$

Where, P(t) is an upper triangular weight matrix of a quadratic performance index, and elements p$_{11}$(t), p$_{12}$(t), p$_{13}$(t), p$_{22}$(t), p$_{23}$(t), p$_{33}$(t) are variables of time t.

The continuous approximation difference of the performance index Q(t) of intelligent course planning for unmanned surface vehicle is recorded as γ(t+1) based on the linear quadratic form function and the cost function, γ(t+1) represents a difference between performance indexes Q(t) and Q(t+1) at adjacent sampling times t and t+1, and an expression of γ(t+1) is as follows:

Q(t)−αQ(t+1)=Q(x(t),u(t))−αQ(x(t+1),u(t+1))=γ[x(t+1),u(t+1),t+1]=γ(t+1).

Where, α represents a discount factor, and 0<α<1, in the embodiment, α is valued as 0.95 (i.e., α=0.95), and a value of α can be changed according to a specific requirement in other embodiments.

For step 5, the neural network model is designed based on the performance index and the continuous approximation difference of the performance index, in the embodiment, the neural network model is a virtual RBF neural network model, and an RBF neural network represents a radial basis function neural network. In the embodiment, a target value of the performance index should be consistent with a target result approximated based on a virtual RBF neural network.

A basic function of the RBF neural network is designed as a 6×1 matrix φ(x(t),u(t)), and a formula of the 6×1 matrix φ(x(t), u(t)) is as follows:

φ(x(t),u(t))=[x$_1$$^2$(t),2x$_1$(t)x$_2$(t),2x$_1$(t)u(t),x$_2$$^2$(t),2x$_2$(t)u(t),u$^2$(t)]$^T$.

In the embodiment, number 6 is a number of the basic function of the virtual RBF neural network.

A connection weight parameter of the RBF neural network is designed as a 6×1 matrix w(t), and a formula of the 6×1 matrix w(t) is as follows:

w(t)=[p$_{11}$(t),p$_{12}$(t),p$_{13}$(t),p$_{22}$(t),p$_{23}$(t),p$_{33}$(t)]T.

Where, each variable in the matrix w(t) is consistent with a corresponding variable in the matrix P(t) in the performance index of intelligent course planning for unmanned surface vehicle, that is, a variable p$_{ij}$(t) in the connection weight parameter w(t) happens to be a variable in i-th row and j-th column in the matrix P(t) in the performance index of intelligent course planning for unmanned surface vehicle. Meanwhile, a form conforming to subsequent matrix calculations is considered in a design of the above formula.

For step 6, the virtual RBF neural network is configured with an evaluation module in the embodiment, and the evaluation module is configured to collect N sampling data pairs of Φ(t) and Γ(t) at adjacent sampling times, among them, Φ(t) is related to the basic function of the RBF neural network model, Γ(t) is related to the continuous approximation difference of the performance index of intelligent course planning for unmanned surface vehicle, the N sampling data pairs are aligned and arranged to obtain $\Phi(t)$ and $\Gamma(t)$, and formulas of $\Phi(t)$ and $\Gamma(t)$ are as follows:

$$\Phi(t) = [\phi_1(x(t), u(t)) - \phi_1(x(t+1), u(t+1)),$$

$$\phi_2(x(t+1), u(t+1)) - \phi_2(x(t+2), u(t+2)), \ldots,$$

$$\phi_N(x(t+N-1), u(t+N-1)) - \phi_N(x(t+N), u(t+N))];$$

$$\Gamma(t) = \begin{bmatrix} \gamma_1[x(t+1), u(t+1), t+1] \\ \gamma_2[x(t+2), u(t+2), t+2] \\ \vdots \\ \gamma_N[x(t+N), u(t+N), t+N] \end{bmatrix}.$$

Where, $\Phi(t) \in \mathbb{R}^{6 \times N}$, and $\Gamma(t) \in \mathbb{R}^{N \times 1}$, N is a number of the sampling data pairs, the number N of the sampling data pairs is larger than or equal to a number of the basic function of the RBF neural network, in the embodiment, N≥6; and a calculation relationship of the N sampling data pairs of $\Phi(t)$ and $\Gamma(t)$ is as follows:

$$\Phi^T(t)w(t) = \Gamma(t).$$

A least square method is used to obtain w(t), and a formula of w(t) is as follows:

$$w(t) = (\Phi(t)\Phi^T(t))^{-1}\Phi(t)\Gamma^T(t).$$

Due to consistency between elements in w(t) and elements in P(t), the function P(t) in the performance index of intelligent course planning for unmanned surface vehicle is equivalently obtained.

For step 7, the obtaining a target course expression of intelligent course planning for unmanned surface vehicle based on the function P(t) in the performance index, includes the following steps.

An approximate dynamic panning is performed on a target formula based on a quadratic form, and a formula of the target formula is as follows:

$$u(t) = \underset{u(t)}{\operatorname{argmin}} Q(t).$$

A partial derivative of the performance index Q(t) of intelligent course planning for unmanned surface vehicle on the target course u(t) is calculated to obtain an expression of the target course u(t) of intelligent course planning for unmanned surface vehicle of the form of direct feedback, and the expression is as follows:

$$u(t) = -\frac{p_{13}(t)}{p_{33}(t)}\Delta x_1(t) - \frac{p_{23}(t)}{p_{33}(t)}\Delta x_2(t).$$

For step 8, a second order partial derivative of the performance index Q(t) of intelligent course planning for unmanned surface vehicle on each state variable x(t) and the target course u(t) is calculated, based on the target course expression and the performance index, to construct the Hessian matrix, and a formula of the Hessian matrix is as follows:

$$\begin{bmatrix} \frac{\partial Q}{\partial x_1^2} & \frac{\partial Q}{\partial x_1 x_2} & \cdots & \frac{\partial Q}{\partial x_1 x_n} & \frac{\partial Q}{\partial x_1 u_1} & \frac{\partial Q}{\partial x_1 u_2} & \cdots & \frac{\partial Q}{\partial x_1 u_n} \\ \frac{\partial Q}{\partial x_2 x_1} & \frac{\partial Q}{\partial x_2^2} & \cdots & \frac{\partial Q}{\partial x_2 x_n} & \frac{\partial Q}{\partial x_2 u_1} & \frac{\partial Q}{\partial x_2 u_2} & \cdots & \frac{\partial Q}{\partial x_2 u_n} \\ \vdots & \vdots & \ddots & \vdots & \vdots & \vdots & \ddots & \vdots \\ \frac{\partial Q}{\partial u_1 x_1} & \frac{\partial Q}{\partial u_1 x_2} & \cdots & \frac{\partial Q}{\partial u_1 x_n} & \frac{\partial Q}{\partial u_1^2} & \frac{\partial Q}{\partial u_1 u_2} & \cdots & \frac{\partial Q}{\partial u_1 u_n} \\ \vdots & \vdots & \ddots & \vdots & \vdots & \vdots & \ddots & \vdots \\ \frac{\partial Q}{\partial u_n x_1} & \frac{\partial Q}{\partial u_n x_2} & \cdots & \frac{\partial Q}{\partial u_n x_n} & \frac{\partial Q}{\partial u_n u_1} & \frac{\partial Q}{\partial u_n u_2} & \cdots & \frac{\partial Q}{\partial u_n^2} \end{bmatrix}.$$

For step 9, the preset requirement of the positive definiteness of the Hessian matrix is formulated by those skilled in the art, in the embodiment, the Hessian matrix is a positive-definite matrix. Under a positive-definite constraint of the positive-definite matrix, each time step of intelligent course planning for unmanned surface vehicle is a target time step, and the each time step is also convergent, that is, an intelligent planning effect is achieved. Finally, the target course expression is output, and the target course expression is input into a feedback network.

Figure 2:
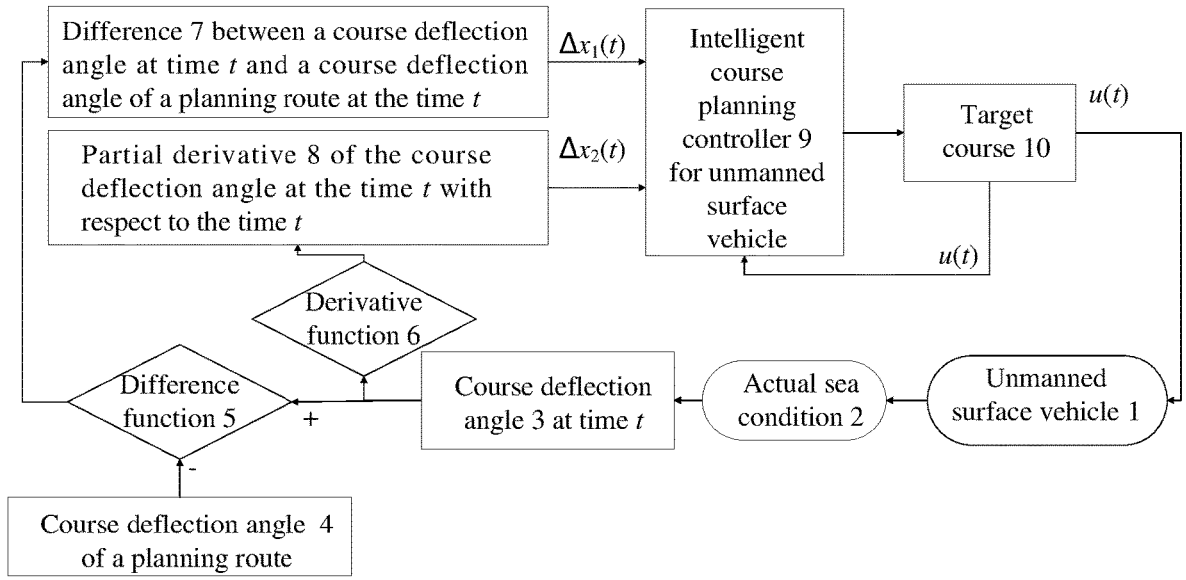
FIG. 2 illustrates a schematic diagram showing a structure and a corresponding principle according to an embodiment of the disclosure.
Figure 3:
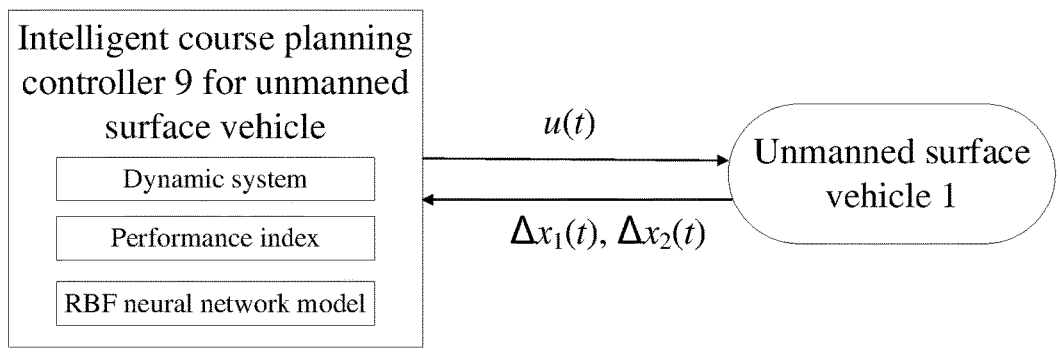
FIG. 3 illustrates a schematic diagram of a connection relationship between an intelligent course planning controller for unmanned surface vehicle and an unmanned surface vehicle according to an embodiment of the disclosure.

FIG. 2 illustrates a schematic diagram showing a structure and a corresponding principle of the disclosure, which constitutes the feedback network. In an embodiment, the target course 10 (i.e., u(t)) with overall optimal and step-by-step optimal is planned by the intelligent course planning controller 9 for unmanned surface vehicle 1 to control the unmanned surface vehicle 1; in an actual sea condition 2, a course deflection angle 3 at time t and a course deflection angle 4 of a planning route at the time t are obtained to obtain the difference 7 (i.e., $\Delta x_1(t)$) between the course deflection angle 3 at the time t and the course deflection angle 4 of the planning route at the time t through a difference function 5; the course deflection angle 3 at the time t is derived to obtain a partial derivative 8 (i.e., $\Delta x_2(t)$) of the course deflection angle 3 at the time t with respect to the time t through a derivative function 6; finally, $\Delta x_1(t)$, $\Delta x_2(t)$, and u(t) are input into the intelligent course planning controller 9 for unmanned surface vehicle 1 to calculate a new target course 10 (i.e., u(t)) through the steps 1-9 of the above embodiments, and the new target course 10 is input into the feedback network again to continuously improve an accuracy of course planning of the unmanned surface vehicle.

The above describes in detail the embodiments of the disclosure. It should be understood that, various modifications and changes according to ideas of the disclosure can be made by those skilled in the art without labor work. Therefore, any technical solutions obtained by those skilled in the art based on the ideas of the disclosure and the related art through logical analysis, reasoning, or limited experiments shall be within the protection scope determined by claims.

What is claimed is:

1. An intelligent course planning method for unmanned surface vehicle, comprising:
   constructing a dynamic system of intelligent course planning for unmanned surface vehicle;
   transforming a form of the dynamic system of intelligent course planning for unmanned surface vehicle;
   designing a cost function of intelligent course planning for unmanned surface vehicle based on the dynamic system of intelligent course planning for unmanned surface vehicle after transforming the form;
   designing a performance index and a continuous approximation difference of the performance index of intelligent course planning for unmanned surface vehicle based on the cost function;

designing a radial basis function (RBF) neural network model based on the performance index and the continuous approximation difference of the performance index;

equivalently obtaining a function in the performance index of intelligent course planning for unmanned surface vehicle based on the neural network model;

obtaining a target course expression of intelligent course planning for unmanned surface vehicle based on the function in the performance index;

constructing a Hessian matrix based on the target course expression and the performance index, and determining a positive definiteness of the Hessian matrix; and in a situation that the positive definiteness of the Hessian matrix meets a preset requirement, outputting the target course expression from a course planning controller, and thereby controlling, based on the target course expression, a course of the unmanned surface vehicle; and inputting the target course expression into a preset feedback network;

wherein the dynamic system of intelligent course planning for unmanned surface vehicle is constructed based on an equation as follows:

$$\ddot{\theta}(t) = -\frac{MgL}{J}\sin(\theta(t)) - \frac{D}{J}\dot{\theta}(t) + \frac{1}{J}v(t) + \frac{1}{J}u(t);$$

where $\theta(t)$ represents a course deflection angle of an unmanned surface vehicle; $\dot{\theta}(t)$ represents a first order partial derivative of the course deflection angle of the unmanned surface vehicle with respect to time; $\ddot{\theta}(t)$ represents a second order partial derivative of the course deflection angle of the unmanned surface vehicle with respect to time; M represents a payload mass of the unmanned surface vehicle; g represents a gravitational acceleration; L represents a length of the unmanned surface vehicle; J represents a moment of inertia of the unmanned surface vehicle; D represents a viscous frictional resistance of the unmanned surface vehicle; $v(t)$ represents a disturbance signal of an actual sea condition; and $u(t)$ represents a target course;

wherein the transforming a form of the dynamic system of intelligent course planning for unmanned surface vehicle, comprises:

defining formulas $\theta(t)=x_1(t)$, and $\dot{\theta}(t)=x_2(t)$; and transforming the form of the dynamic system of intelligent course planning for unmanned surface vehicle by using formulas as follows:

$$\begin{cases} \dot{x}(t) = x_2(t) \\ \dot{x}_2(t) = -\frac{MgL}{J}\sin(x_1(t)) - \frac{D}{J}x_2(t) + \frac{1}{J}v(t) + \frac{1}{J}u(t) \end{cases};$$

where $\dot{x}_1(t)$ represents a first order partial derivative of $x_1(t)$ with respect to time, $\dot{x}_2(t)$ represents a first order partial derivative of $x_2(t)$ with respect to time; and wherein in the form, a state variable of the dynamic system of intelligent course planning for unmanned surface vehicle is $x(t)=[x_1(t),x_2(t)]^T$;

wherein a formula of the designing a cost function of an intelligent course planning for unmanned surface vehicle based on the dynamic system of intelligent course planning for unmanned surface vehicle after transforming the form is as follows:

$$\gamma(t)=\gamma[x(t),u(t),t]=a_1\Delta x_1^2(t)+a_2\Delta x_2^2(t)+a_3u^2(t);$$

where both $\gamma(t)$ and $\gamma[x(t),u(t),t]$ represent cost functions of intelligent course planning for unmanned surface vehicle at time t; $\Delta x_1(t)$ represents a difference between a course deflection angle at the time t and a course deflection angle of a planning route at time t, $\Delta x_2(t)$ represents a partial derivative of the course deflection angle at the time t with respect to the time t; and $a_1$, $a_2$, and $a_3$ represent optimization weight coefficients of $\Delta x_1(t)$, $\Delta x_2(t)$ and $u(t)$, respectively;

wherein formulas for designing, based on a linear quadratic form function, the performance index Q(t) of intelligent course planning for unmanned surface vehicle are as follows:

$$Q(t) = [\Delta x_1(t), \Delta x_2(t), u(t)]P(t)[\Delta x_1(t), \Delta x_2(t), u(t)]^T;$$

$$P(t) = \begin{bmatrix} p_{11}(t); & p_{12}(t); & p_{13}(t) \\ & p_{22}(t); & p_{23}(t) \\ & & p_{33}(t) \end{bmatrix};$$

where P(t) is an upper triangular weight matrix of a quadratic performance index, and each of elements in P(t) is a variable of the time t;

wherein the continuous approximation difference of the performance index Q(t) of intelligent course planning for unmanned surface vehicle is recorded as $\gamma(t+1)$ based on the cost function, $\gamma(t+1)$ represents a difference between performance indexes Q(t) and Q(t+1) at adjacent sampling times t and t+1, and an expression of $\gamma(t+1)$ is as follows:

$$Q(t)-\alpha Q(t+1)=Q(x(t),u(t))-\alpha Q(x(t+1),u(t+1))=\gamma[x(t+1),u(t+1),t+1]=\gamma(t+1);$$

where $\alpha$ represents a discount factor, and $\alpha>0$;

wherein the designing an RBF neural network model based on the performance index and the continuous approximation difference of the performance index, comprises:

designing a basic function of an RBF neural network as a matrix $\phi(x(t),u(t))$, wherein a formula of the matrix $\phi(x(t),u(t))$ is as follows:

$$\phi(x(t),u(t))=[x_1^2(t),2x_1(t)x_2(t),2x_1(t)u(t),x_2^2(t),2x_2(t)u(t),u^2(t)]^T;$$

designing a connection weight parameter of the RBF neural network as a matrix w(t), wherein a formula of the matrix w(t) is as follows:

$$w(t)=[p_{11}(t),p_{12}(t),p_{13}(t),p_{22}(t),p_{23}(t),p_{33}(t)]^T;$$

where each variable in the matrix w(t) is consistent with a corresponding variable in the matrix P(t) in the performance index of intelligent course planning for unmanned surface vehicle.

2. The intelligent course planning method for unmanned surface vehicle as claimed in claim 1, wherein N sampling data pairs of $\Phi(t)$ and $\Gamma(t)$ at adjacent sampling times are collected by the RBF neural network model, and $\Phi(t)$ is related to the basic function of the RBF neural network, $\Gamma(t)$ is related to the continuous approximation difference of the performance index of intelligent course planning for unmanned surface vehicle, the N sampling data pairs are aligned and arranged to obtain $\Phi(t)$ and $\Gamma(t)$, and formulas of $\Phi(t)$ and $\Gamma(t)$ are as follows:

$$\Phi(t) = [\phi_1(x(t), u(t)) - \phi_1(x(t+1), u(t+1)),$$
$$\phi_2(x(t+1), u(t+1)) - \phi_2(x(t+2), u(t+2)), \ldots ,$$
$$\phi_N(x(t+N-1), u(t+N-1)) - \phi_N(x(t+N), u(t+N))];$$

$$\Gamma(t) = \begin{bmatrix} \gamma_1[x(t+1), u(t+1), t+1] \\ \gamma_2[x(t+2), u(t+2), t+2] \\ \vdots \\ \gamma_N[x(t+N), u(t+N), t+N] \end{bmatrix};$$

wherein a number N of the sampling data pairs is larger than or equal to a number of the basic function of the RBF neural network; and a calculation relationship of the N sampling data pairs of $\Phi(t)$ and $\Gamma(t)$ is as follows:

$$\Phi^T(t)w(t) = \Gamma(t);$$

wherein a least square method is used to obtain w(t), and a formula of w(t) is as follows:

$$w(t) = (\Phi(t)\Phi^T(t))^{-1}\Phi(t)\Gamma^T(t);$$

wherein the function P(t) in the performance index of intelligent course planning for unmanned surface vehicle is equivalently obtained.

3. The intelligent course planning method for unmanned surface vehicle as claimed in claim 2, wherein the obtaining a target course expression of intelligent course planning for unmanned surface vehicle based on the function P(t) in the performance index, comprises:

performing approximate dynamic planning on a target formula based on a quadratic form, wherein a formula of the target formula is as follows:

$$u(t) = \operatorname*{argmin}_{u(t)} Q(t); \text{ and}$$

calculating a partial derivative of the performance index Q(t) of intelligent course planning for unmanned surface vehicle on the target course u(t) to obtain the target course expression of intelligent course planning for unmanned surface vehicle, and the target course expression is as follows:

$$u(t) = -\frac{p_{13}(t)}{p_{33}(t)}\Delta x_1(t) - \frac{p_{23}(t)}{p_{33}(t)}\Delta x_2(t).$$

4. The intelligent course planning method for unmanned surface vehicle as claimed in claim 3, further comprising: calculating, based on the target course expression and the performance index, a second order partial derivative of the performance index Q(t) of intelligent course planning for unmanned surface vehicle on each state variable x(t) and the target course u(t) to construct the Hessian matrix, wherein a formula of the Hessian matrix is as follows:

$$\begin{bmatrix} \frac{\partial Q}{\partial x_1^2} & \frac{\partial Q}{\partial x_1 x_2} & \cdots & \frac{\partial Q}{\partial x_1 x_n} & \frac{\partial Q}{\partial x_1 u_1} & \frac{\partial Q}{\partial x_1 u_2} & \cdots & \frac{\partial Q}{\partial x_1 u_n} \\ \frac{\partial Q}{\partial x_2 x_1} & \frac{\partial Q}{\partial x_2^2} & \cdots & \frac{\partial Q}{\partial x_2 x_n} & \frac{\partial Q}{\partial x_2 u_1} & \frac{\partial Q}{\partial x_2 u_2} & \cdots & \frac{\partial Q}{\partial x_2 u_n} \\ \vdots & \vdots & \ddots & \vdots & \vdots & \vdots & \ddots & \vdots \\ \frac{\partial Q}{\partial u_1 x_1} & \frac{\partial Q}{\partial u_1 x_2} & \cdots & \frac{\partial Q}{\partial u_1 x_n} & \frac{\partial Q}{\partial u_1^2} & \frac{\partial Q}{\partial u_1 u_2} & \cdots & \frac{\partial Q}{\partial u_1 u_n} \\ \vdots & \vdots & \ddots & \vdots & \vdots & \vdots & \ddots & \vdots \\ \frac{\partial Q}{\partial u_n x_1} & \frac{\partial Q}{\partial u_n x_2} & \cdots & \frac{\partial Q}{\partial u_n x_n} & \frac{\partial Q}{\partial u_n u_1} & \frac{\partial Q}{\partial u_n u_2} & \cdots & \frac{\partial Q}{\partial u_n^2} \end{bmatrix}.$$

5. An intelligent course planning controller for unmanned surface vehicle, comprising: a memory and a processor, wherein the memory is configured to store a computer program, the processor is configured to call the computer program to execute the intelligent course planning method for unmanned surface vehicle as claimed in claim 1.

* * * * *